(12) United States Patent
Tam et al.

(10) Patent No.: US 6,842,466 B1
(45) Date of Patent: Jan. 11, 2005

(54) SEMICONDUCTOR PASSIVE Q-SWITCH PROVIDING VARIABLE OUTPUTS

(75) Inventors: Siu Chung Tam, Singapore (SG); Jian Hui Gu, Singapore (SG); Yee Loy Lam, Singapore (SG)

(73) Assignee: Nanyang Technological University (SG)

( * ) Notice: Subject to any disclaimer, the term of this patent is extended or adjusted under 35 U.S.C. 154(b) by 0 days.

(21) Appl. No.: 09/618,431

(22) Filed: Jul. 18, 2000

(51) Int. Cl.[7] .............................. H01S 3/10; H01S 3/11; H01S 3/113
(52) U.S. Cl. ............................ 372/25; 372/10; 372/11
(58) Field of Search ............................ 372/10–16, 25, 372/43–50, 72, 75

(56) References Cited

U.S. PATENT DOCUMENTS

| | | | | |
|---|---|---|---|---|
| 4,833,333 A | * | 5/1989 | Rand ........................ | 250/492.3 |
| 4,868,834 A | * | 9/1989 | Fox et al. .................... | 372/20 |
| 5,005,176 A | * | 4/1991 | Lam et al. ................... | 372/10 |
| 5,015,353 A | * | 5/1991 | Hubler et al. .......... | 204/192.31 |
| 5,621,747 A | * | 4/1997 | Kitoh et al. .................. | 372/45 |
| 5,802,083 A | * | 9/1998 | Birnbaum .................... | 372/11 |
| 6,160,824 A | * | 12/2000 | Meissner et al. .............. | 372/7 |
| 6,215,805 B1 | * | 4/2001 | Sartorius et al. .............. | 372/50 |
| 6,394,788 B1 | * | 5/2002 | Early et al. .................... | 431/1 |

OTHER PUBLICATIONS

L.D. Landau and E.M. Lifschitz, "Electrodynamics of Continuous Media", Course of Theoretical Physics vol. 8, Pergamon Press, Oxford, Reprinted English Edition 1981; ISBN 0–08–009105–9; particularly, paragraph 62, pp. 256–262.*

M. Young, "Optics and Lasers, including optical fibers and waveguides", Springer Verlag, Third Rev. Edition, Berlin (ISBN 0–387–16127–9) 1986; pp. 170–171.*

Jianhui Gu, Siu–Chung Tam, Yee–Loy Lam, Chan–Hin Kam, Hongru Yang, Junggang Liu, Wenjie Xie, Gang Zhao, Yihong Chen and Wilson Tan; "Investigation on the use of semiconductor as Q–switch as well as output coupler for diode–pumped solid–state lasers", Conference on Lasers and Electro–Optics (CLEO 2000) *Technical Digest*, Post conference Edition. TOPS vol. 39, pp. 7–12 May 2000, San Francisco, CA.

(List continued on next page.)

*Primary Examiner*—Nathan J. Flynn
*Assistant Examiner*—Johannes Mondt
(74) *Attorney, Agent, or Firm*—Baker Botts LLP

(57) ABSTRACT

A semiconductor wafer with variable transmittance, serves as a saturable absorber for performing passive Q-switching in a laser system to produce laser pulses having defined output characteristics. By translating or rotating the semiconductor saturable absorber, loss properties of a laser cavity may be altered. In this manner, the output characteristics of the laser pulses can be varied without changing other parameters of laser operation. The output characteristics may include pulse duration, pulse repetition rate, peak power and average output power of the laser pulses. The semiconductor wafer can be made of doped or undoped GaAs, AlGaAs, InP, etc. Furthermore, the tunable Q-switch may simultaneously serve as an output coupler for the laser cavity.

16 Claims, 6 Drawing Sheets

OTHER PUBLICATIONS

Jianhui Gu, Feng Zhou, Kah Tau Wan, Tuan Kay Lim, Siu–Chung Tam, Yee Loy Lam, Desheng Xu and Zuhai Cheng Q–switching of a diode–pumped Nd: $YVO_4$ laser with GaAs nonlinear output coupler, *Optics and Lasers in Engineering,* 35 (5): pp. 299–207 (2001).

Jianhui Gu, Feng Zhou, Siu Chung Tam, Yee Loy Lam,Chan Hin Kam, Wenjie Xie, Tuan Kay Lim and Tuan Kah Tau, "Q–switching of diode–end pumped Nd:$YVO_4$ laswer with GaAs outut coupler"; *Photonic Systems and Applications in Defense and Manufacturing,* Singapore, Dec. 1999, SPIE 3898, pp. 170–177 (1999).

Jianhui Gu, Feng Zhou, Wenjie Xie, Siu Chung Tam and Yee Loy Lam, "Passive Q–switching of a diode–pumped Nd:YAG laser with a GaAs output coupler"; *Optics Communications;* 165: pp. 245–249 (1999).

Jianhui Gu, Feng Zhou, Siu ChungTam, Wenjie Xie, Yee Loy Lam and Yihong Chen "Passive Q–switching of a Nd:YAG laser with a GaAs output coupler"; *Optical Engineering;* 38(11): pp. 1785–1788 (1999).

* cited by examiner

SEMICONDUCTOR PASSIVE Q-SWITCH PROVIDING VARIABLE OUTPUTS

TECHNICAL FIELD

This invention relates to passive Q-switching of a laser system. In particular the invention relates to a passive Q-switch that may be used in a laser system to produce laser pulses having variable output characteristics. The Q-switch may include a semiconductor wafer. The output characteristics of the laser pulses may be tuned by changing the transmittance of the wafer. The output characteristics may include pulse duration and pulse repetition rate of the Q-switched laser beam. The same semiconductor wafer may be simultaneously used as the output coupler of the cavity of the laser to render the laser system more compact.

BACKGROUND OF THE INVENTION AND PRIOR ART

Q-switching is a common and effective technique to achieve optical pulses with short duration, high repetition rate and high peak power. These characteristics are required for laser ranging, nonlinear studies, medicine, laser micromachining, and other important applications. Q-switching can be effected using an active device which is controlled or driven by an external signal. Q-switching can also be performed using a passive structure that has no external control, but instead operates periodically as a result of its own properties. The present invention relates to a laser system using such a passive Q-switching method.

Passive Q-switching employing a saturable absorber as a Q-switch element is economical, simple and practical. There are many different materials and configurations for passive Q-switching.

U.S. Pat. No. 3,997,854 entitled "Passive Q-Switch Cell", issued to Buchman et al, discloses a passive Q-switch cell of a liquid saturable solution of dye used on the laser wavelength of 1.06 µm. U.S. Pat. No. 4,637,030 entitled "Switching Laser", issued to Midavaine et al, discloses a passive Q-switching method with absorption gas used on the laser wavelength of 10.6 µm. U.S. Pat. No. 5,414,724 entitled "Monolithic Self Q-Switched Laser", issued to Zhou et al, discloses a monolithic self-Q-switched laser with a single Cr:Nd:YAG crystal to generate laser pulses at the wavelength of 1.06 µm. U.S. Pat. No. 5,832,008 entitled "Eyesafe Laser System Using Transition Metal-Doped Group II–VI Semiconductor as a Passive Saturable Absorber Q-Switch", issued to Bimbaum et al, discloses a passive Q-switch element of Co:ZnSe for laser system at the wavelength of 1.54 µm and 1.6 µm. U.S. Pat. No. 5,724,372 entitled "Diode-Pumped Laser System Using Uranium-Doped Q-Switch", issued to Stultz et al, discloses a diode-pumped Er:Yb:Glass laser with an output from about 1.5 µm to 1.6 µm and Q-switched with U:$CaF_2$. U.S. Pat. No. 5,802,083 entitled "Saturable Absorber Q-Switches for 2-µm Laser", issued to Bimbaum et al, discloses a passively Q-switched laser with an output from about 1.6 µm to 2.3 µm using Ho:YLF or Ho:$YVO_4$ as Q-switch material. U.S. Pat. No. 5,237,577 entitled "Monolithically Integrated Fabry-Perot Saturable Absorber", issued to Keller et al, discloses a Fabry-Perot saturable absorber with a construction of multiple quantum well of AlAs/GaAs, which can be used as a saturable absorber in passive Q-switching and passive modelocking. It was also used as the end mirror of a diode-end-pumped Nd:YLF laser.

Active Q-switching allows a user to vary the output characteristics of a laser beam. A major disadvantage of passive Q-switching, as compared to active Q-switching, is non-adjustability of the parameters of the Q-switched pulses. There is no effective way to control or adjust the parameters of passive Q-switching. It would be useful to devise a technique that is capable of adjusting the parameters of passively Q-switched pulses using a single saturable absorber in the laser cavity.

Saturable absorbers are known to be key elements for passive Q-switching. Materials such as solids, liquids and gases have been used as saturable absorbers based upon the chosen wavelength of laser operation. Generally, the theoretically shortest pulse duration achievable from a Q-switched laser system is limited by the round-trip time of the laser cavity. The shorter the laser cavity, the shorter the Q-switched pulse duration. Therefore shortening the laser cavity is an effective way to get shorter pulses.

Existing Q-switches are mainly made of active devices that make use of acousto-optic or electro-optic effects. These Q-switches require drivers to operate. It would be desirable to provide a tunable passive Q-switch that is a simple device requiring no external drivers and hence may offer reduced operating costs and can render a laser resonator very compact.

Kajava et al [Optics Letters, 21(6), 1996] use a piece of GaAs wafer inside the cavity of an end-pumped Nd:YAG laser to achieve passive Q-switching. The GaAs wafer has a fixed transmittance value. By changing the pump power, the output characteristics of the laser, such as the pulse repetition rate and pulse duration, will vary. However, there are disadvantages in using pump power as the control variable as the emission wavelength of the diode laser may drift away from its optimum value, the temperature of the diode laser may take a long time to stabilise, and the beam quality of the Nd:YAG laser output may change substantially.

Through experimental and theoretical studies [J. H. Gu, et al, *SPIE* Vol. 3398, pp.170–177, November 1999], it is found that the GaAs wafers used for passive Q-switching may exhibit Fabry-Perot (F-P) effect. Furthermore, effective transmittance of a GaAs wafer, which is generated by this F-P effect, could create a large impact on the output characteristics of the passively Q-switched laser. Based on this prior art, further improvements were made and the following details the improvements.

SUMMARY OF THE INVENTION

The current invention is conceptualized based on this new development. By applying gradient coating on a single piece of GaAs wafer, the effective transmittance of the GaAs wafer can be varied. Therefore, using a single piece of gradient coated GaAs wafer, the laser output characteristics of the GaAs Q-switch, operating at a fixed pump power, can be varied. This improvement avoids the many disadvantages of using pump power as the variable parameter in changing the laser output characteristics.

According to the present invention there is provided a semiconductor passive Q-switch providing variable output suitable for use in a laser system to produce laser pulses having defined output characteristics including a lasing wavelength, said Q-switch including variable transmittance means at the lasing wavelength for adjusting said output characteristics of said laser pulses.

Typically, the laser system may employ a Nd:$YVO_4$ crystal lasing at the wavelength of 1.06 µm with a diode laser used as the pumping source at the wavelength of 808 nm. A piece of undoped semiconductor wafer may serve as a Q-switch. This wafer may also serve as the output coupler of the laser cavity. One advantage of employing such a construction is that there is no need to insert extra elements into the laser cavity as a Q-switch element or as an output coupler, so that the length of the laser cavity can be shortened, and consequently shorter-duration Q-switched pulses can be obtained.

The Q-switch may include a wafer of GaAs. The surface of the GaAs wafer may be coated so that the transmittance varies for different parts of the wafer. Variations can be effected in a stepwise manner, such that different patches of the wafer may give different transmissions. The variation can also be effected in a gradual manner along a linear length of the wafer, or along a curvilinear path on the wafer. The parameters of the Q-switched laser pulses may be adjusted by moving the wafer with respect to the axis of the laser cavity.

Typically, the Q-switch utilizes a piece of undoped GaAs wafer, which has the characteristics of saturable absorption, in the spectrum of the IR range. Other doped and undoped semiconductors with the property of saturable absorption, such as AlGaAs, InP, InGas, etc., can be used as the Q-switch element in this technique. Multiple-quantum-well semiconductor structures are also suitable candidates.

The device can be applied to Q-switched solid-state lasers for scientific and technological applications such as micromachining (e.g. sensors and actuators, laser cleaning of hard discs, etc.), micro-fabrication (microlithography, laser assisted thin film deposition, etc.), biomedical studies (tattoo removal, dental treatment, etc.), etc.

BRIEF DESCRIPTION OF THE DRAWINGS

A preferred embodiment of the present invention will now be described with reference to the accompanying drawings wherein:

FIG. 5 shows a typical oscilloscope trace of a laser pulse as a function of time for the laser system of FIG. 1, using a GaAs wafer as a Q-switch as well as an output coupler of FIG. 2a.

DETAILED DESCRIPTION OF THE INVENTION

Figure 1:
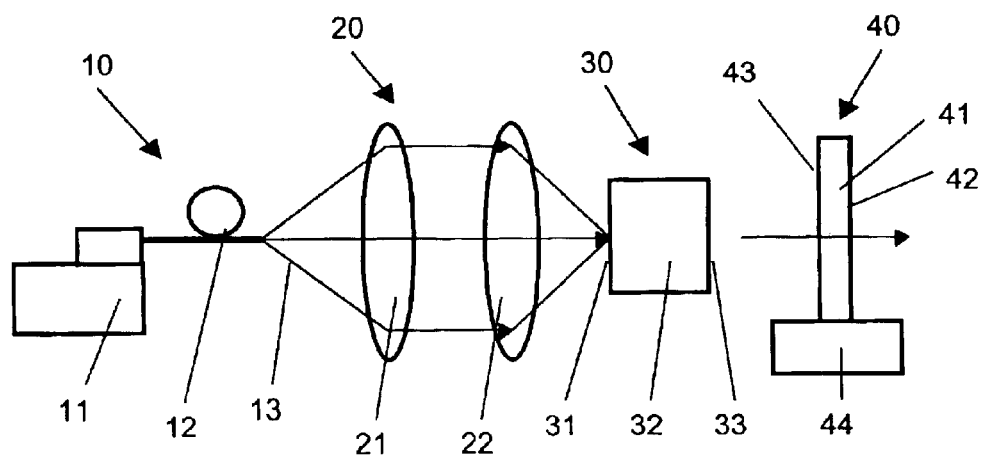
FIG. 1 is a schematic drawing of a laser system that utilizes the present invention.

FIG. 1 illustrates schematically the use of a semiconductor wafer in a laser system including a pumping source 10, a beam shaping system 20, a laser gain material 30, and a passive Q-switch 40, which also serves as the output coupler for the laser system. In an alternative embodiment, the tunable passive Q-switch may not operate simultaneously as the output coupler of the laser system. In such a case, in line with common practice in the trade, a partially transmitting mirror at the laser wavelength may be used as the output coupler.

The pumping source 10 consists of a diode laser 11 and delivery optical fiber 12, providing a pumping laser beam 13, which has a center wavelength matching the absorption peak of the laser crystal 32. The laser beam 13 is collimated by a first lens 21 and then focused by a second lens 22 to a laser crystal 32. The laser crystal 32 is 1% (by atomic weight) doped Nd:YVO$_4$, with one facet 31 anti-reflection (AR) coated at the wavelength of 808 nm and high-reflection (HR) coated at the wavelength of 1.06 $\mu$m and serving as a total reflection mirror of the laser cavity, and another facet 33 AR coated at the wavelength of 1.06 $\mu$m. Element 40 includes a piece of semiconductor wafer 41, which is coated gradually on its surface 42 and/or surface 43, and a miniature translation stage 44, on which element 41 is mounted. Element 40 serves as a passive Q-switch as well as the output coupler of the laser cavity.

In other embodiments, the end-pumping geometry may be altered or simplified. In yet other embodiments, the laser medium 30 may be pumped by the diode laser 10 from the side, or may be pumped simultaneously from the end and by the side.

Figure 2A:
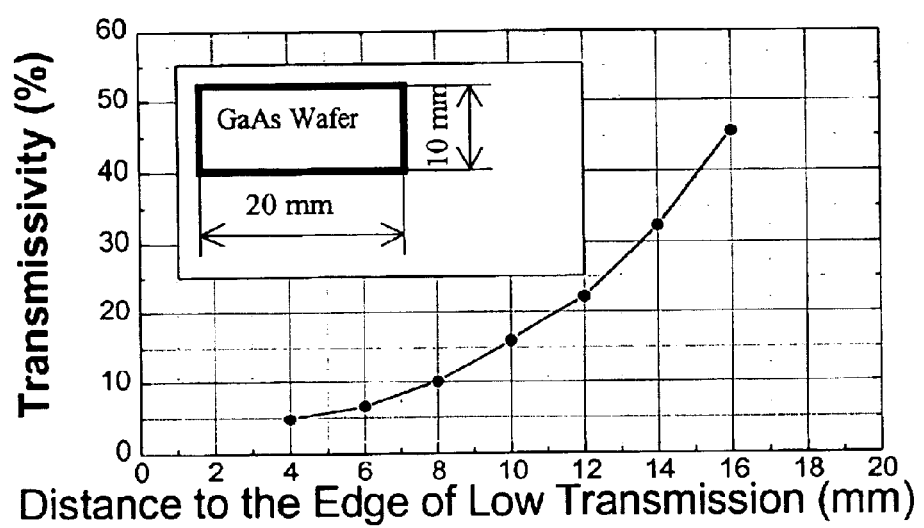
FIG. 2a shows a typical measured transmission distribution curve of the passive Q-switch shown in FIG. 1, using a piece of graded GaAs wafer as the tunable element at the wavelength of 1.06 $\mu$m.

FIG. 2a shows details of an example of the Q-switch element 40. The element 40 is a piece of undoped GaAs wafer with a dimension of 20 mm in length, 10 mm in width and 625 $\mu$m in thickness. Its two faces are optically polished, and both of its two surfaces are gradually coated with AR coating. The curve in FIG. 2a indicates the measured distribution of transmission at the wavelength of 1.06 $\mu$m in the direction along the length of the wafer. It has a homogenous transmission distribution in the direction along the width of the wafer.

In other embodiments, one side of the wafer may be coated to provide variable transmission, and the other side of the wafer may be uncoated. In yet other embodiments, discrete patches giving different transmittance values may be used instead of a graded structure, or variation of transmittance may be effected by rotation instead of linear translation. Variable transmittance may also be effected by using a semiconductor with variable thickness, e.g., a wedge. Typical patterns and structures for element 41 are shown in FIGS. 2b(i) to 2b(iv).

Figure 2B:
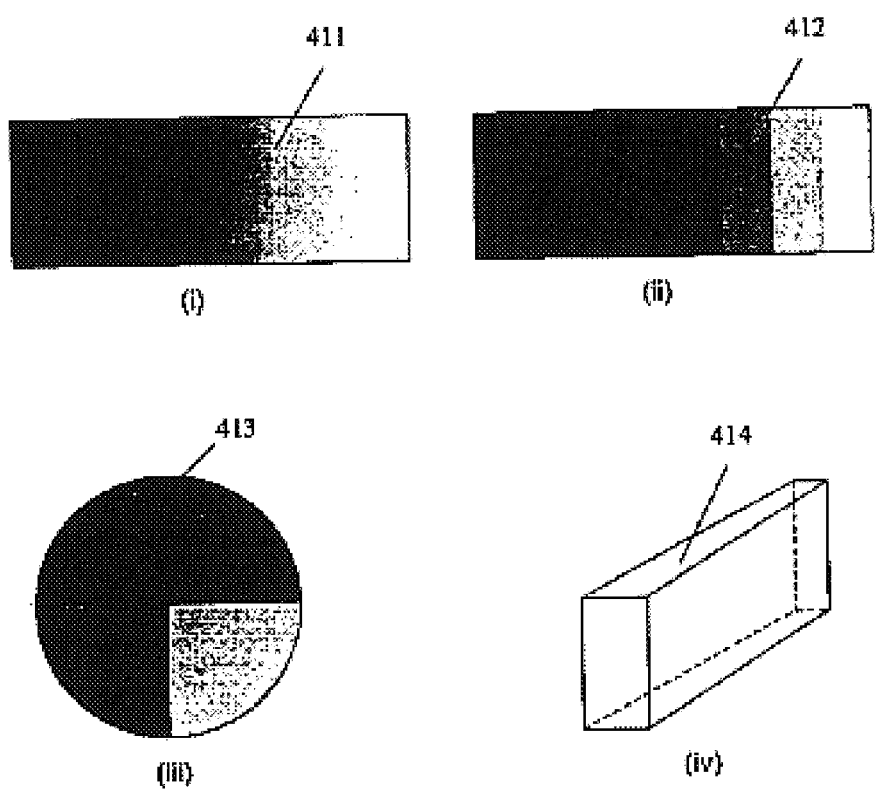
FIGS. 2b(i) to 2b(iv) show typical patterns and structure for the passive Q-switch.

In FIG. 2b(i), element 411 represents a rectangular structure of element 41 with a gradient distribution of transmittance and in FIG. 2(b)(ii) element 412 represents a rectangular structure of element 41 but with a discrete distribution of transmittance. In FIG. 2b(iii) element 413 represents a circular structure of element 41 with a gradient or discrete azimuthal distribution of transmittance and in FIG. 2b(iv) element 414 represents a wedged structure of element 41, having a different transmittance at each different thickness.

One theory of using a semiconductor material for passive Q-switching is presented herein. More detailed descriptions can be found in J. H. Gu et al (*Optical Engineering*, 38 (11), pp. 1785–1788 (1999). The bandgap of GaAs is 1.42 eV and the photon energy of the laser radiation at the wavelength of 1.06 $\mu$m is 1.17 eV. Therefore, there is no band-to-band absorption occurring at this wavelength. However, because the EL2 defect energy level is 0.82 eV below the conduction band, GaAs exhibits saturable absorption characteristics at the wavelength of around 1.0 $\mu$m, mainly contributed by processes of two-photon-absorption and free-carrier-absorption. The property of saturable absorption makes GaAs a good candidate to be used as a saturable absorber in a laser cavity to perform passive Q-switching.

Q-switching is accomplished by making the cavity loss an explicit function of photon density, as in the case of the passive Q-switching by saturable absorption of GaAs. In the present invention, element 40 provides both saturable loss as a saturable absorber and coupling loss as an output coupler of the laser cavity. The parameters of passively Q-switched laser pulses, such as pulse duration, pulse repetition rate, peak power, and averaged output power, are determined by the loss property of the laser cavity.

According to conventional rate equations which can be used to describe the output characteristics of Q-switched operation, it is well known that under a certain pumping condition, the loss of the laser cavity will be a unique parameter determining photon density inside the laser cavity and population inversion density within the laser gain material. Therefore, the parameters of the Q-switched laser pulses can be adjusted by changing the loss property of the laser cavity: This makes it possible to improve a major disadvantage of passive Q-switching, namely its general inability to provide adjustability to its output characteristics.

In the present invention, adjusting translation stage 44 to move element 40 with properties as indicated in FIG. 2a along its length, will change the transmission of the output coupler as well as the loss properties of the laser cavity. Therefore, the parameters of the passively Q-switched laser pulses can be adjusted continuously or discretely.

Figure 3:
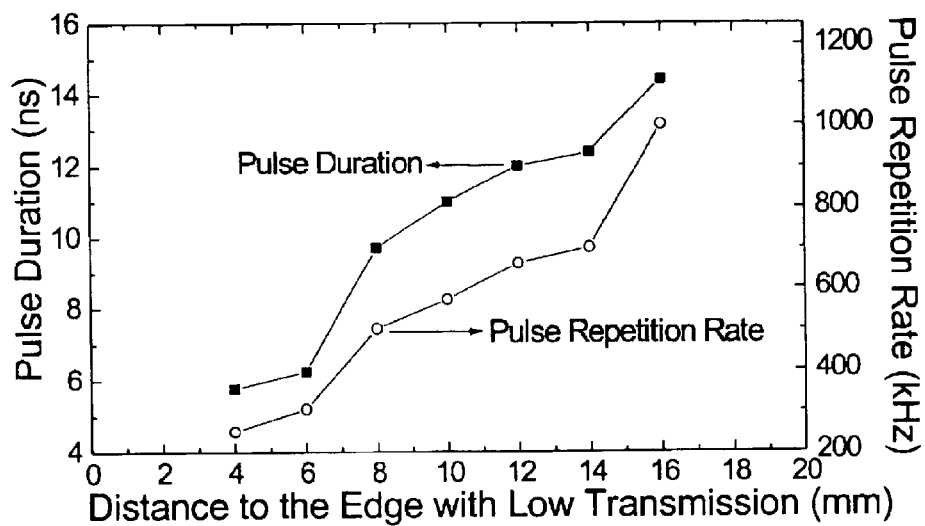
FIG. 3 shows typical measured results of variations of pulse duration and pulse repetition rate of the Q-switched pulses when the wafer is adjusted along its length direction, while keeping all other operating conditions of the laser system unchanged.

FIG. 3 shows a typical result of variations of measured pulse duration and pulse repetition rate from the laser system shown in FIG. 1 at different locations when the element 40 is moved from one end to the other. Pulse duration increases from 5.7 ns to 14.5 ns and the corresponding pulse repetition rate increases from 250 kHz to 1.0 MHz when the distance to the edge with low transmission is increased from 4 mm to 16 mm, while keeping all other parameters of the laser operation unchanged: the beam power of the pumping diode laser is 3.9 W at the wavelength of 808 nm; the laser crystal 32 has a dimension of 3 mm×3 mm×5 mm; the gap between the GaAs wafer 41 and the laser crystal 32 is 1 mm; and the physical length of the laser cavity is 6 mm. During adjustment, the transmittance of element 40 increases from 4.8% to 45.6% as shown in FIG. 2a.

Figure 4:
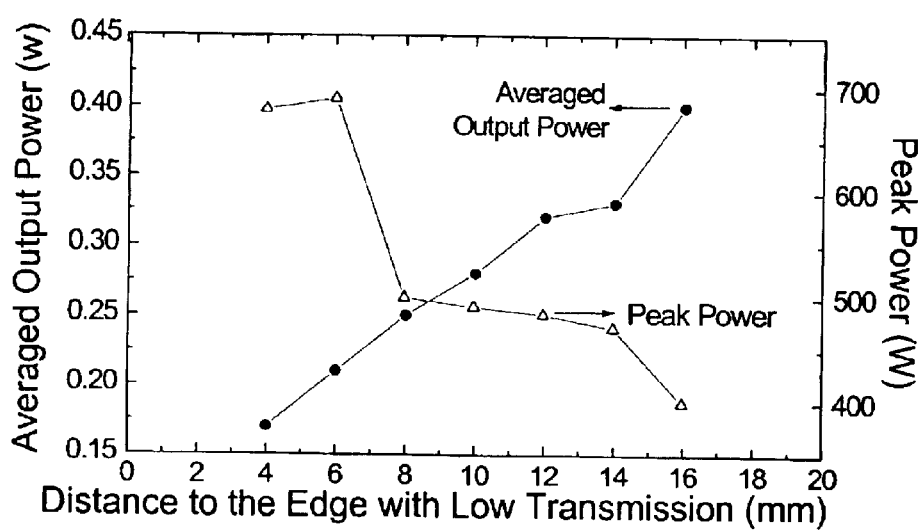
FIG. 4 shows typical measured results of variations of averaged power and peak power of the Q-switched output pulses when moving the wafer along its length direction, while keeping all other operating conditions of the laser system unchanged.

FIG. 4 shows the variation of measured averaged output power and peak power from the passively Q-switched laser system of FIG. 1 operating with the same settings described above. The average output power increases from 0.17 W to 0.4 W when the transmittance increases from 4.8% to 45.6%.

Figure 5:
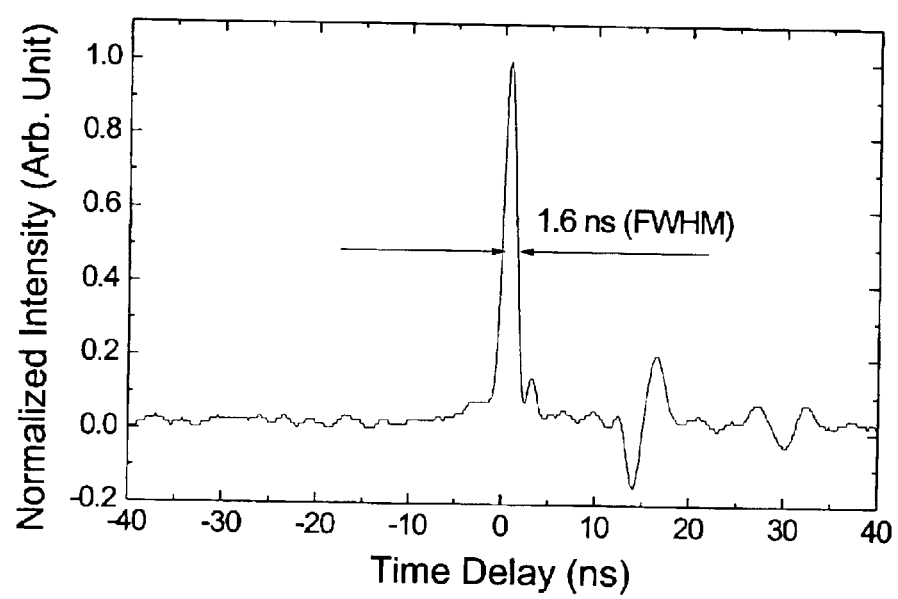

In another embodiment, the shortest pulse duration obtained from the passively Q-switched laser system is 1.6 ns. This is evident from the oscilloscope trace of the temporal development of a laser pulse shown in FIG. 5. The results are obtained with element 40 being a piece of GaAs wafer with a thickness of 625 $\mu$m and with one side uncoated and the other side coated to form a gradient transmission profile. The measured output characteristics of the passively Q-switched pulses have similar tuning capabilities as described above by adjusting the position of element 40 in FIG. 1.

The present invention may thus provide a means of passively Q-switching a laser system with a variable transmittance semiconductor wafer as a Q-switch element. The wafer can double-up as an output coupler. Using this device, the operating characteristics of the passively Q-switched laser pulses can be adjusted by changing the location of the wafer while keeping the laser operating parameters unchanged. Such characteristics include the pulse duration, pulse repetition rate, and output power of the laser beam.

Although the present invention has been described with reference to a particular embodiment, viz. a diode-pumped solid-state laser, it will be apparent to persons skilled in the art that the present invention may be applied to other kinds of solid-state lasers, such as lamp-pumped solid-state lasers, and suitable lasers in general. Furthermore, the present invention can also be used for other IR wavelengths because certain types of semiconductor materials and bandgap-engineered materials have the properties of both saturable absorption, which is required as a passive Q-switch, and partial transmission in the IR spectrum which is required as an intracavity element or as an output coupler.

Finally, it is to be understood that various alterations, modifications and/or additions may be introduced into the constructions and arrangements of parts previously described without departing from the spirit or ambit of the invention.

What is claimed is:

1. A semiconductor passive Q-switch suitable for use in a laser system to produce laser pulses having variable pulse duration and pulse repetition frequencies, wherein said semiconductor passive Q-switch has a coating with variable transmittance for different locations of said coating for tuning said pulse durations and pulse repetition frequencies.

2. A semiconductor passive Q-switch according to claim 1 wherein the laser pulses have variable peak power and averaged output power.

3. A semiconductor passive Q-switch according to claim 1 comprising a wafer having two surfaces that are optically polished, one or both surfaces being optically coated to form a gradient variation of transmission at a wavelength substantially in the IR region.

4. A semiconductor passive Q-switch according to claim 3 wherein said surfaces are optically coated to form a gradient variation of transmission at a wavelength in the IR region.

5. A semiconductor passive Q-switch according to claim 1 wherein tuning of said output characteristics is effected by translating the Q-switch in a direction transverse to the optical axis of the laser system.

6. A semiconductor passive Q-switch according to claim 1 wherein tuning of said output characteristics is effected by moving the Q-switch in a curvilinear path.

7. A semiconductor passive Q-switch according to claim 6 wherein said curvilinear path included circular rotation.

8. A semiconductor passive Q-switch according to claim 1 wherein said Q-switch functions simultaneously as an output coupler of said laser system.

9. A semiconductor passive Q-switch according to claim 1 including undoped GaAs.

10. A semiconductor passive Q-switch according to claim 1 including doped or undoped semiconductor material having properties of saturable absorption in the IR spectrum.

11. A semiconductor passive Q-switch according to claim 10 wherein said semiconductor material includes AlGaAs or InP.

12. A semiconductor passive Q-switch according to claim 1 having a multiple-quantum-well configuration.

13. A laser system incorporating a semiconductor passive Q-switch according to claim 1, said laser system including a solid-state laser that is diode-end-pumped, diode-side pumped, hybrid-pumped, lamp-pumped or pumped with other lasers.

14. A laser system incorporating a semiconductor passive Q-switch according to claim 1 and adapted to produce a laser output at a wavelength centered at an IR wavelength.

15. A laser system according to claim 14 wherein said IR wavelength is 1.06 Mu.

16. A semiconductor passive Q-switch suitable for use in a laser system to produce laser pulses having variable pulse durations and pulse repetition frequencies, wherein said semiconductor passive Q-switch comprises a body of material having variable thickness at different locations of said body for tuning said pulse durations and pulse repetition frequencies.

* * * * *